United States Patent
Crippa et al.

(10) Patent No.: US 10,690,202 B2
(45) Date of Patent: Jun. 23, 2020

(54) PAD, ASSEMBLY, CLAMP AND METHOD FOR BRAKE DISC

(71) Applicant: FRENI BREMBO S.P.A., Curno (IT)

(72) Inventors: Cristian Crippa, Curno (IT); Adriano Bonetti, Curno (IT); Lorenzo Nessi, Curno (IT); Daniel Longhi, Curno (IT)

(73) Assignee: Freni Brembo S.p.A., Curno (IT)

( * ) Notice: Subject to any disclaimer, the term of this patent is extended or adjusted under 35 U.S.C. 154(b) by 0 days.

(21) Appl. No.: 15/475,263

(22) Filed: Mar. 31, 2017

(65) Prior Publication Data

US 2017/0284488 A1    Oct. 5, 2017

(30) Foreign Application Priority Data

Mar. 31, 2016 (IT) .................. 102016000033361

(51) Int. Cl.
| | |
|---|---|
| *F16D 65/095* | (2006.01) |
| *F16D 55/2265* | (2006.01) |
| *F16D 65/092* | (2006.01) |
| *F16D 69/00* | (2006.01) |
| *F16D 65/00* | (2006.01) |
| *F16D 65/18* | (2006.01) |
| *F16D 55/00* | (2006.01) |

(52) U.S. Cl.
CPC ....... *F16D 65/095* (2013.01); *F16D 55/2265* (2013.01); *F16D 65/0006* (2013.01); *F16D 65/0068* (2013.01); *F16D 65/092* (2013.01); *F16D 65/18* (2013.01); *F16D 69/00* (2013.01); *F16D 2055/007* (2013.01); *F16D 2055/0016* (2013.01); *F16D 2069/004* (2013.01)

(58) Field of Classification Search
CPC .. F16D 65/095; F16D 65/092; F16D 55/2265; F16D 69/00; F16D 2055/007; F16D 65/0006; F16D 65/0068; F16D 65/18; F16D 2069/004; F16D 2055/0016
See application file for complete search history.

(56) References Cited

U.S. PATENT DOCUMENTS

| | | |
|---|---|---|
| 3,322,236 A | 5/1967 | Burnett |
| 4,093,043 A | 6/1978 | Smith |
| (Continued) | | |

FOREIGN PATENT DOCUMENTS

| | | |
|---|---|---|
| DE | 1425212 A1 | 3/1969 |
| DE | 102004021126 A1 | 11/2005 |
| (Continued) | | |

OTHER PUBLICATIONS

Search Report for Italian Application No. ITUA20162181, dated Dec. 6, 2016.

*Primary Examiner* — Melody M Burch
(74) *Attorney, Agent, or Firm* — Marshall & Melhorn, LLC

(57) ABSTRACT

A pad for a brake caliper for a disc brake of a vehicle having a caliper body and a brake disc adapted to abut against a braking band of the brake disc. The pad has at least one plate and one friction material supported by the plate. The plate has a first side and a second side arranged at opposite tangential ends of the plate. The plate also has at least a first side ear and at least a second side ear. The two ears are each provided with slots. The two slots are adapted to accommodate corresponding associable pins mounted to the caliper body with clearance.

7 Claims, 8 Drawing Sheets

(56) References Cited

U.S. PATENT DOCUMENTS

| 8,556,046 B2* | 10/2013 | Ciotti | F16D 65/095 |
| | | | 188/250 B |
| 2011/0226566 A1 | 9/2011 | Zenzen et al. | |
| 2012/0043168 A1 | 2/2012 | Narayanan et al. | |
| 2015/0041259 A1 | 2/2015 | Ishizuka et al. | |

FOREIGN PATENT DOCUMENTS

| EP | 2746612 A1 | 6/2014 |
| JP | H08303498 A | 11/1996 |
| WO | 2010010583 A1 | 1/2010 |
| WO | 2012077754 A1 | 6/2012 |

\* cited by examiner

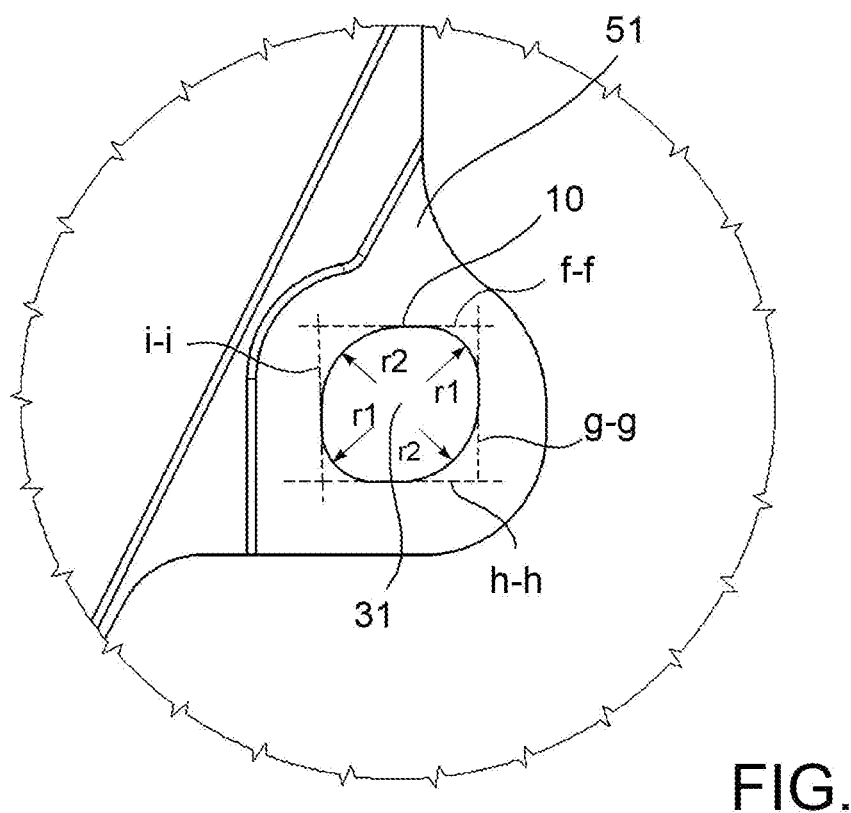
FIG. 13bis
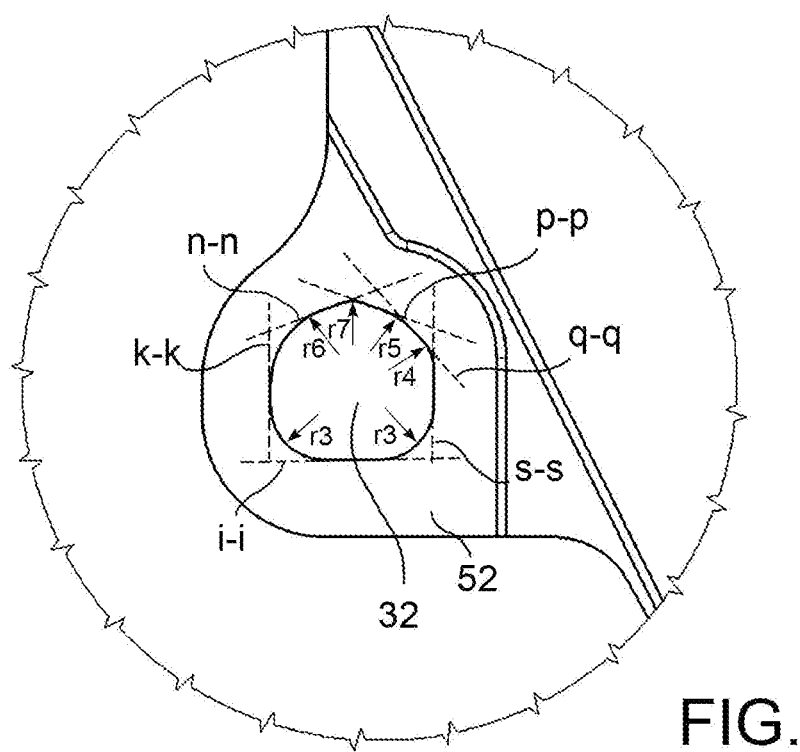
FIG. 14bis

PAD, ASSEMBLY, CLAMP AND METHOD FOR BRAKE DISC

FIELD OF THE INVENTION

The present invention relates to a pad for a brake caliper for a disc brake of a vehicle, as well as to a brake caliper comprising said pad.

In particular, the present invention relates to a pad adapted to be mounted with clearance on pins provided in the brake caliper.

Furthermore, the present invention relates to an assembly of said pad and at least two pins, as well as to a method for positioning said pad during the braking action.

BACKGROUND ART

In a disc brake, the brake caliper is generally arranged straddling the outer peripheral margin of a brake disc, adapted to rotate about a rotation axis defining an axial direction. In a brake disc, a radial direction, which is substantially orthogonal to said axial direction, and a tangential or circumferential direction, orthogonal to both said axial direction and said radial direction, is further defined, to form a substantially cylindrical coordinate system.

The known brake calipers are generally provided with pads adapted to engage a braking band of the brake disc associable with the brake caliper to cause the deceleration of the vehicle on which the brake caliper is installed. The pads may be replaced by pins, connected to the brake caliper body, and may thus comprise eyelets, in which the pins are inserted with clearance, so as to allow the pads to slide along them, when they are subjected to the action of the specific thrust means.

According to a known type of pads, the pins also have the function of transmitting the braking force to the brake caliper itself, rather than allowing the pads to abut with a side thereof on the brake caliper to relieve such a braking action.

The plate of such a type of pads comprises a pair of side ears, which extend laterally in tangential direction, in which eyelets are provided intended to accommodate the pins. Said side ears are usually made on a radially inner portion of the plate.

The eyelets usually display a square shape with rounded or beveled angles. The pins which support the pads, instead, usually have circular section cylindrical shape. The distance and the size of the eyelets and the pins are chosen so that, during the braking action, the pad is pulled and transmits the braking force to the pin arranged on the inlet side of the brake disc, in the gap between the pads, while the pin arranged on the outlet side of the disc implements a radial resting.

In particular, the eyelets and the pins are shaped so that, during the braking action, the mutual contact between the pin to which the braking force is transmitted and the eyelet substantially occurs in two contact points, in particular a first contact point, in which the pin supports the pad, and a second contact point, in which the braking force is transmitted to the pin during braking.

Pads which can be related to the aforesaid category are shown, for example, in documents US-2011-226566 and US-2012-043168.

However, such solutions have some drawbacks.

Indeed, as soon as the braking is triggered, the pad is free to move and to accelerate by virtue of the clearance with which it is connected to the pins, and thus collides against one of them, in particular in the previously identified second contact point. Such a collision causes the emission of a noise, known as knock, which, since it is a collision, triggers vibrations in the braking system which may also energize natural frequencies of the system or of a component thereof, generating annoying vibrations and, above all, noise.

Such a situation is naturally even more critical in the case of successive steps of forward travel-braking-reversing-braking, and vice versa, because multiple collisions occur alternatively against the two supporting pins which work, in turn, as relieving pin of the braking action. As known, knock causes low comfort of the vehicle on which the brake caliper is installed, particularly in the case of high performance and luxury vehicles.

For example, documents EP-2746612 and WO-2010-010583, by the Applicant, and document US-2015-041259 show symmetric or specular pad solutions comprising eyelets having particular shape, entirely similar as a "D", adapted to reduce the aforesaid knock phenomenon. According to these disclosures, the knock phenomenon is reduced by increasing the number and improving the distribution of the contact points between pins and walls of the pad eyelets. The symmetric or specular configuration of the eyelets on the pad allows a conforming behavior both in forward travel conditions and in reversing conditions.

Such solutions, although partially advantageously, have some drawbacks.

Indeed, such known eyelets are inappropriate to both work simultaneously to determine a reduction of the tangential acceleration of the pad with respect to the pins. In other words, in such conditions, the pad relieves in all cases the entire tangential component of the braking action solely by means of the contact between the eyelet arranged on the inlet side of the brake pad and its respective pin.

The need is thus strongly felt to solve the drawbacks of the prior art mentioned herein.

At the same time, the need is felt to provide a brake caliper solution for brake disc capable of applying a quieter braking action with respect to known solutions, both in forward driving conditions and in reversing conditions of the vehicle.

Solution

It is an object of the present invention to devise a solution for the needs expounded with reference to the prior art.

It is a further object of the present invention to suggest an improved pad type for brake disc caliper capable of providing an optimized relieving action, from the pad to the pins, of the forces and stresses which occur during braking.

It is a further object of the present invention to provide a brake disc for a vehicle brake disc adapted to perform quiet braking, or quieter braking than the known solutions, both in forward travel conditions and in reversing conditions of the vehicle.

These and other objects are achieved by a pad according to claim 1, an assembly according to claim 7, a brake caliper according to claim 9, and a method according to claim 10.

Some advantageous embodiments are the subject matter of the dependent claims.

According to an aspect of the invention, the provision of asymmetric or non-specular slots on the supporting plate of the pad having a specifically designed profile allows an optimal distribution of the tangential components of the forces deriving from the braking action between the pads and both pins at the same time.

By virtue of the simultaneous tangential biasing of both supporting pins of the pad, it is possible to cancel or at least strongly mitigate, with respect to known solutions, the accelerations between pads and pins responsible for the knock phenomena due to collisions between the slot walls and the respective pin.

According to an aspect of the invention, a pad comprises mutually different slots, said pad having non-specular profile and said slots being specifically shaped to bias in tangential direction both pins simultaneously, said pad is adapted to provide the contact between each pin and the respective slot walls during the braking action continuously and without interruption, thus resulting inappropriate to allow the detachment between pins and pad while guaranteeing an assembly with clearance of the pad of the pins to allow them to slide axially, when moved by specific thrust means.

DRAWINGS

Further features and advantages of the pad, system, brake caliper and method according to the invention will become apparent from the description provided below of preferred embodiments thereof, given by way of non-limiting examples, with reference to the accompanying drawings, in which:

FIGS. 13bis and 14bis are further enlargements of the portions shown by the arrows XIII and XIV in FIG. 12, respectively.

DESCRIPTION OF SOME PREFERRED EMBODIMENTS

Figure 1:
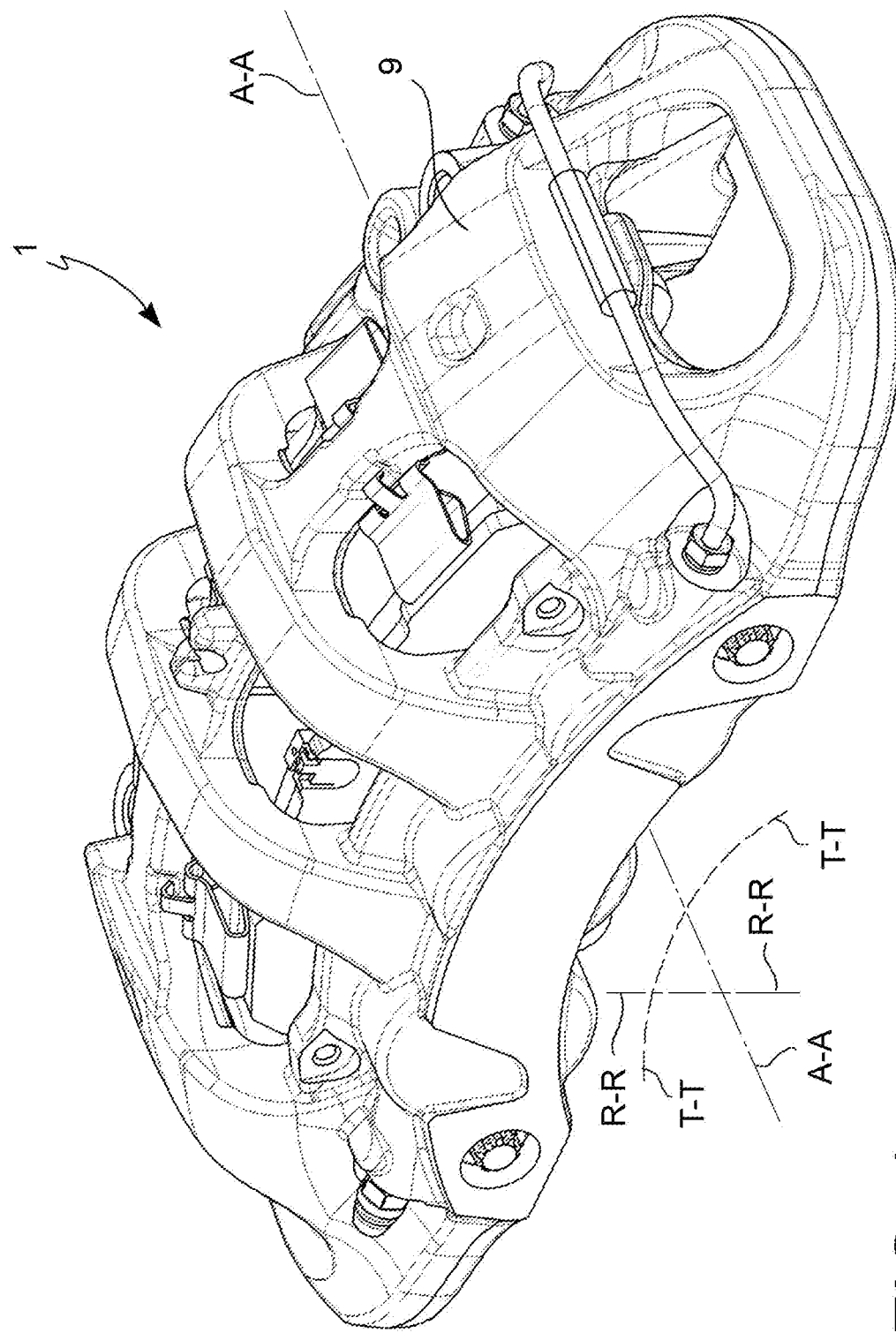
FIG. 1 is an axonometric view of a brake caliper, according to an embodiment.
Figure 2:
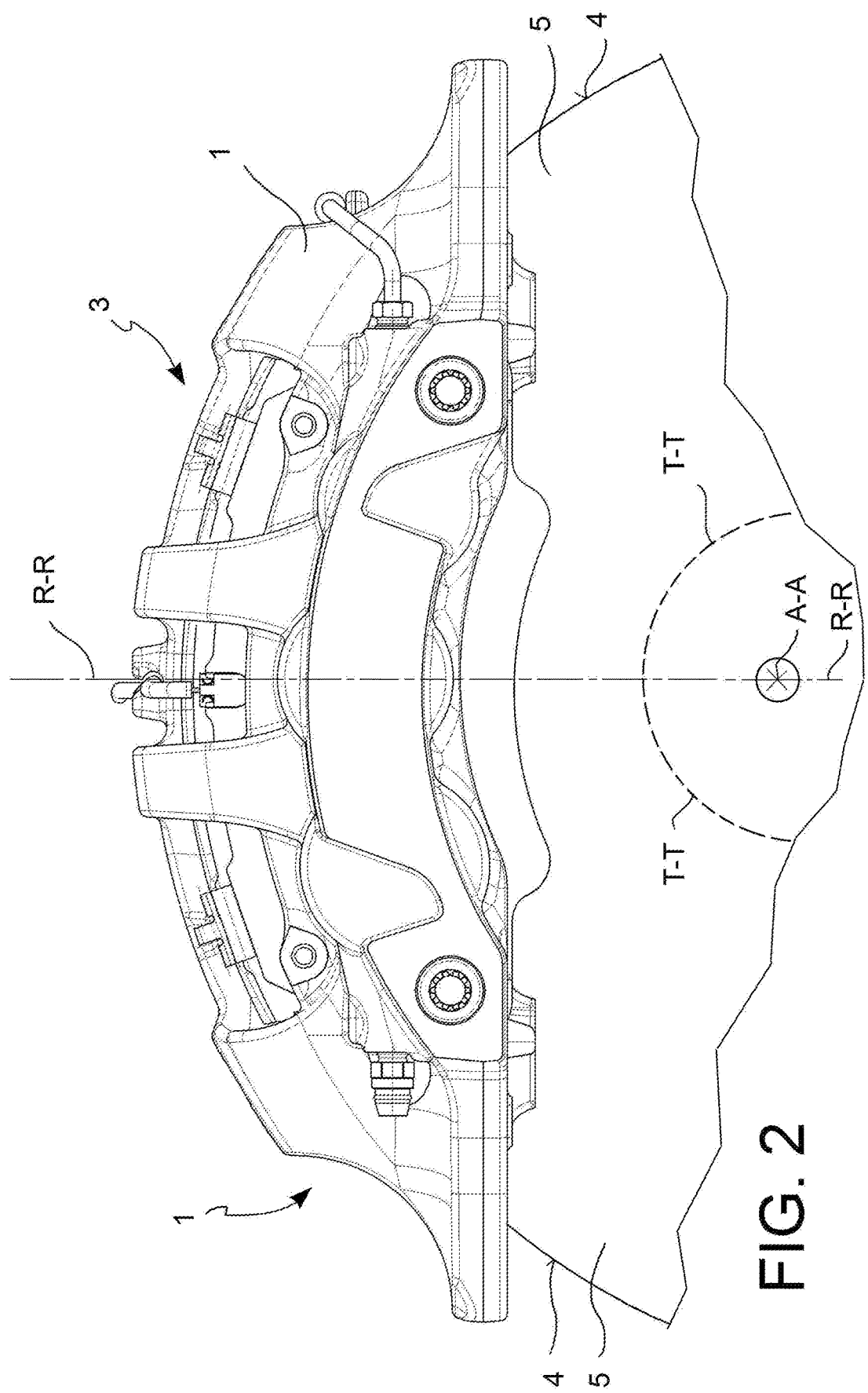
FIG. 2 is a side view of a portion of a brake disc, according to an embodiment.
Figure 3:
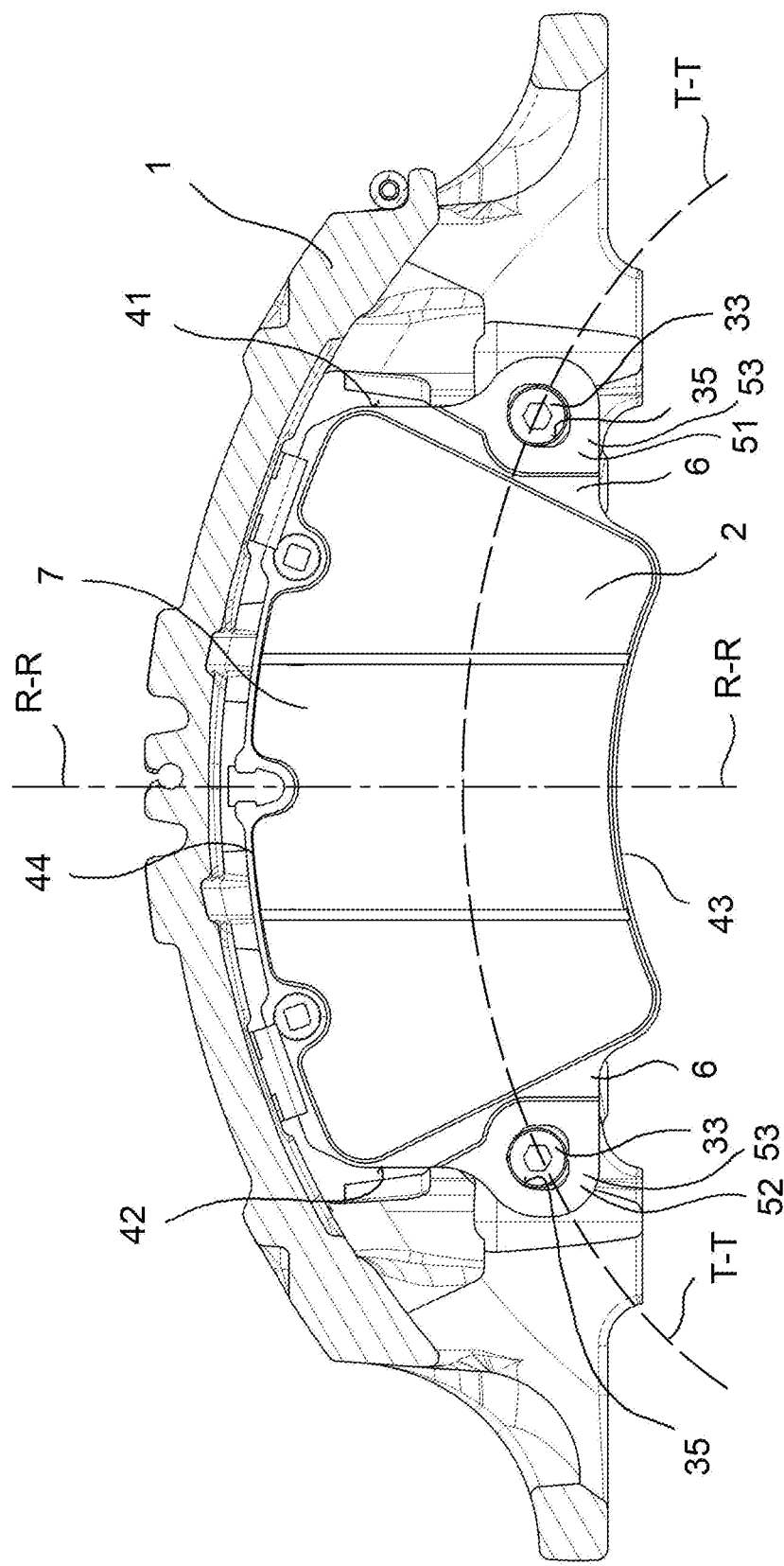
FIG. 3 is a diagrammatic section taken along a longitudinal plane of a brake caliper, according to an embodiment.
Figure 4:
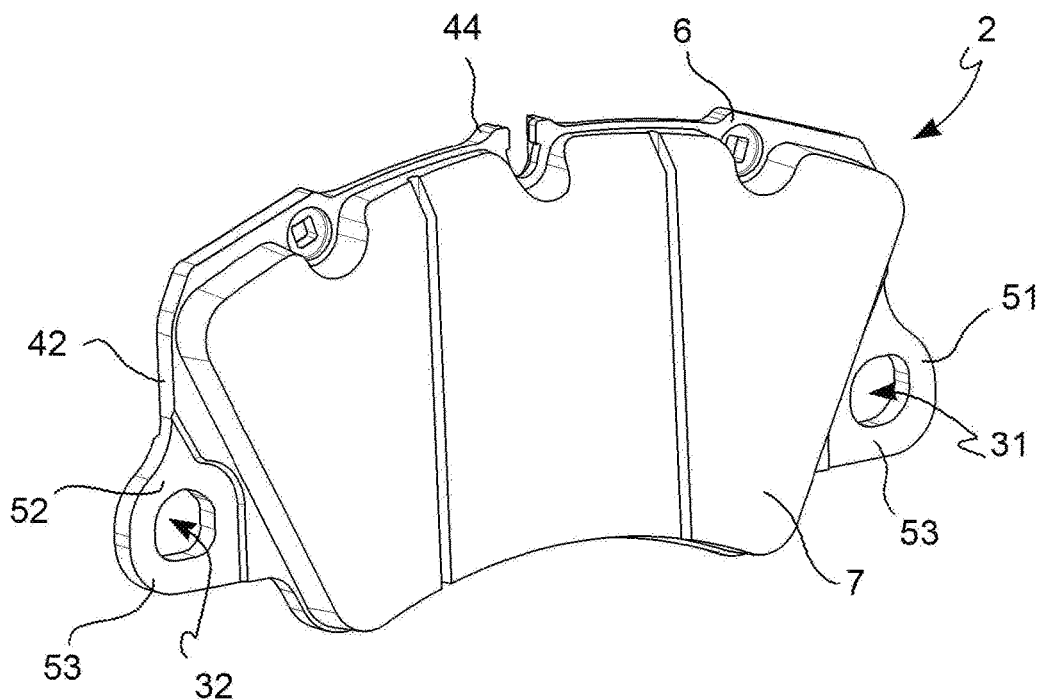
FIG. 4 is an axonometric view which shows a pad, according to an embodiment.

According to a general embodiment, a pad 2 for a brake caliper 1 for a disc brake 3 of a vehicle comprising a caliper body 9 and a brake disc 4 is adapted to abut against a braking band 5 of the brake disc 4 and comprises at least one plate 6 and one friction material 7 supported by said plate 6.

Said disc brake 3 defines an axial direction A-A, either coinciding with or parallel to the rotation axis of the brake disc 4, a radial direction R-R, orthogonal to the axial direction A-A, and a tangential or circumferential direction T-T, orthogonal to both the axial direction A-A and the radial direction R-R.

The axial A-A, radial R-R and tangential T-T directions are herein understood as defined also for pad 2, also when pad 2 is not mounted to the brake caliper 9.

Said plate 6 has prevalent extension along the radial direction R-R and tangential directions T-T.

Said plate 6 comprises a radially inner edge 43 and a radially outer edge 44. The expression "radially inner edge" means the edge closer to the rotation axis of the brake disc 4, when pad 2 is mounted to the caliper body 9, and the expression "radially outer edge" means the edge furthermost from the brake disc 4, when pad 2 is mounted to the caliper body 9.

Said plate 6 comprises a first side 41 and a second side 42, arranged at opposite tangential ends of plate 6. When in forward travel conditions of the vehicle, said first side 41 is arranged on the side of the pad which sees the inlet of the brake disc in the gap between the pads, while said second side 42 is arranged on the side of the pad which sees the outlet of the brake disc from the pad gap. Naturally, in reversing conditions of the vehicle, said second side 42 is arranged on the side of the pad which sees the inlet of the brake disc in the gap between the pads, while said first side 41 is arranged on the side of the pad which sees the outlet of the brake disc from the pad gap.

Said plate 6 further comprises at least a first side ear 51, which extends from said first side 41 at least in tangential direction T-T, and at least a second side ear 52, which extends from said second side 42 at least in tangential direction T-T. In other words, said first side ear 51 and said second side ear 52 extend from opposite tangential ends of plate 6.

Said first side ear 51 is provided with at least a first slot 31 and said second side ear 52 is provided with at least a second slot 32, so that said plate comprises at least two slots 31, 32.

According to a preferred embodiment, said pad 2 defines a radial centerline u-u, adapted to substantially divide the radial distance in half between said radially inner edge 43 and said radially outer edge 44, and wherein said first side ear 51 and said second side ear 52 extend from side portions at least partially arranged in a radially inner portion of the plate with respect to the radial centerline u-u.

Said at least two slots 31, 32 are adapted to accommodate with clearance corresponding associable pins 33 mounted to the caliper body 9. As known, the provision of said clearance allows the pad to slide relatively to the pins 33, when subjected to the action of specific thrust means, e.g. for example cylinder-piston assemblies mounted to the brake caliper 1. Said pad 2 belongs to the so-called "pulled" pad type for brake calipers, in other words adapted to relieve the braking action on associable pins 44 provided in the caliper body 9, and do not belong to the type of pads adapted to relieve the braking action by abutting against one or more walls of the caliper body instead of on pins.

Each of said first side ear 51 and said second side ear 52 comprises an ear surface 53, adapted to face the braking band 5 of the brake disc 4.

Said first slot 31 defines a first slot profile 10 on plate 6 and said second slot 32 defines a second slot profile 20 on plate 6. In other words, said first slot 31 defines said first slot profile 10 on the ear surface 53 of the first side ear 51 and said second slot 32 defines said second slot profile 20 on the ear surface 53 of the second side ear 52.

Advantageously, each of said first slot profile 10 and said second slot profile 20 forms a closed path.

More advantageously, said first slot profile 10 and said second slot profile 20 have a different shape, preventing said plate 6 from being symmetric or specular. Said pad 2 is asymmetric with respect to a definable median axis m-m, passing through the radially inner edge 43 and the radially outer edge 44 of pad 2. The median axis m-m is adapted to divide pad 2 into two portions of substantially equal extension in tangential direction T-T. According to an embodiment, said median axis m-m is substantially parallel to the radial direction R-R.

According to a preferred embodiment, said first slot profile 10 is symmetric with respect to two second profile symmetry axes y-y, w-w.

According to an embodiment, said two second profile symmetry axes y-y, w-w are mutually orthogonal.

According to an embodiment, said first slot profile 10 is symmetric with respect to two second profile symmetry axes y-y, w-w, so that said first slot profile 10 describes a central symmetric figure.

According to an embodiment, said first slot profile 10 is symmetric with respect to a single point or first profile symmetry center C, so that said first slot profile 10 describes a central symmetry figure and is at the same time axial-symmetric with respect to two symmetry axes or second profile symmetry axes y-y, w-w, which intersect in said single first profile symmetry center C.

According to an embodiment, said first slot profile 10 is symmetric with respect to a first profile single symmetry point C, so that said first slot profile 10 describes a central symmetric figure. In other words, said first slot profile 10 has a symmetric shape with respect to a single identifiable point or first profile symmetry center C.

According to an embodiment, said second slot profile 20 is inappropriate to describe a central symmetry figure. According to a preferred embodiment, said second slot profile 20 has a non-symmetric or non-specular shape.

With the inclusion of such slots 31, 32 and such slot profiles 10, 20, said pad 2 allows an optimal distribution of the tangential component of the forces deriving from the braking action between the pad and both the pins simultaneously. This however does not mean that the tangential component of the forces deriving from the braking action is necessarily evenly distributed on both pins.

According to an embodiment, each of said first slot profile 10 and said second slot profile 20 comprises curved portions and rectilinear portions.

According to an embodiment, each of said first slot profile 10 and said second slot profile 20 forms a convex flat figure.

According to an embodiment, said first slot profile 10 comprises four rectilinear portions or first slot sides 11, 12, 13, 14.

According to an embodiment, said four first slot sides 11, 12, 13, 14 comprise a first slot radially inner side 11 and a first slot radially outer side 12. Said first slot radially inner side 11 is arranged closer in radial direction R-R to the rotation axis of the brake disc 4 associable to the brake caliper 1 adapted to house pad 2, and said first slot radially outer side 12 is arranged further in radial direction R-R from the rotation axis of the brake disc 4 associable with the brake caliper 1 adapted to house pad 2 with respect to said first slot radially inner side 11.

According to an embodiment, said four first slot sides 11, 12, 13, 14 comprise a first slot tangentially inner side 13 and a first slot tangentially outer side 14. Said first slot tangentially inner side 13 is arranged closer in tangential direction T-T to the median axis m-m of pad 2, and said first slot tangentially outer side 14 is arranged further in tangential direction T-T from the median axis m-m of pad 2 with respect to said tangentially inner side 13.

According to an embodiment, said four first slot sides 11, 12, 13, 14 are parallel to each other in pairs.

According to an embodiment, said four first slot sides 11, 12, 13, 14 define a quadrilateral, having four equal angles, which circumscribe said first slot profile 10, with their extensions or first slot side extensions f-f, g-g, h-h, i-i.

According to an embodiment, said quadrilateral is a rectangle. In other words, the shape of said first slot profile 10 is such as to be inscribed in a rectangle.

According to an embodiment, said quadrilateral is a square. In other words, the shape of said first slot profile 10 is such as to be inscribed in a square.

According to an embodiment, said four first slot sides 11, 12, 13, 14 are joined by four first slot curved or arc portions 15, 16, 17, 18.

According to an embodiment, said four first slot arcs 15, 16, 17, 18 comprise a first slot radially inner and tangentially inner arc 15 and a first slot radially outer and tangentially outer arc 16. Said first slot radially inner and tangentially inner arc 15 joins said first slot radially inner side 11 and said first slot tangentially inner side 13. Said first slot radially outer and tangentially outer arc 16 joins said first slot radially outer side 12 and said first slot tangentially outer side 14.

According to an embodiment, said four first slot arcs 15, 16, 17, 18 comprise a first slot radially inner and tangentially outer arc 17 and a first slot radially outer and tangentially inner arc 18. Said first slot radially inner and tangentially outer arc 17 joins said first slot radially inner side 11 and said first slot tangentially outer side 14. Said first slot radially outer and tangentially inner arc 18 joins said first slot radially outer side 12 and said first slot tangentially inner side 13.

According to an embodiment, said four first slot arcs 15, 16, 17, 18 face each other are opposite in pairs.

According to an embodiment, the curvature radius r1, r2 of each of said four first slot arcs 15, 16, 17, 18 is substantially constant.

According to an embodiment, the curvature radius r1 of said first slot radially inner and tangentially inner arc 15 and said first slot radially outer and tangentially outer arc 16 is substantially of the same length and equal to a first curvature radius r1.

According to an embodiment, the curvature radius r2 of said first slot radially inner and tangentially outer arc 17 and said first slot radially outer and tangentially inner arc 18 is substantially of the same length and equal to a second curvature radius r2.

According to an embodiment, said second slot profile 20 comprises five second slot rectilinear portions or sides 21, 22, 23, 27, 29.

According to an embodiment, five second slot sides 21, 22, 23, 27, 29 comprise a second slot radially inner side 21, a second slot tangentially inner side 22 and a second slot tangentially outer side 23. Said five second slot sides 21, 22, 23, 27, 29 are identified similarly as described above for the first slot sides 11, 12, 13, 14.

According to an embodiment, said second slot tangentially inner side 22 and said second slot tangentially outer side 23 are parallel and face each other.

According to an embodiment, said second slot tangentially inner side 22 is longer than said second slot tangentially outer side 23.

According to an embodiment, said three second slot sides 21, 22, 23 describe an open or non-closed figure with their extensions or second slot side extensions j-j, k-k, s-s, q-q. In other words, the second slot side extensions j-j, k-k, s-s, q-q are inappropriate to define a closed figure.

According to an embodiment, said three second slot sides 21, 22, 23 are joined by second slot curved portions or arcs 24, 25, 26.

According to an embodiment, said second slot arcs 24, 25, 26 comprise a second slot radially inner and tangentially inner arc 24, a second slot radially inner and tangentially outer arc 25 and a second slot radially outer arc 26. Said second slot radially inner and tangentially inner arc 24 joins said second slot radially inner side 21 and said second slot tangentially inner side 22. Said second slot radially inner and tangentially outer arc 25 joins said second slot radially inner side 21 and said second slot tangentially outer side 23. Said second slot radially outer arc 26 joins said second slot tangentially inner side 22 and said second slot tangentially outer side 23.

According to an embodiment, the curvature radius r3 of said second slot radially inner and tangentially inner arc 24 and said second slot radially inner and tangentially outer arc 25 is substantially of the same length and equal to a third curvature radius r3.

According to an embodiment, said second slot radially outer arc 26 comprises a tangentially inner side portion 27 and a tangentially outer side portion 28. According to an embodiment, said tangentially inner side portion 27 is substantially rectilinear.

According to an embodiment, said tangentially inner side portion 27 comprises a radially inner arc portion 19 and a radially outer arc portion 29, so that said second slot radially outer arc 26 comprises a tangentially inner and radially inner arc portion 19.

According to an embodiment, each of said tangentially inner and radially inner arc portion 19, and of said tangentially inner and radially outer arc portion 29 has a substantially constant curvature radius r4, r5.

According to an embodiment, said tangentially inner and radially inner arc portion has curvature radius r4 equal to a fourth curvature radius r4.

According to an embodiment, the curvature radius r5 of said tangentially inner and radially outer arc portion 29 is equal to a fifth curvature radius r5.

According to an embodiment, the tangents of said tangentially inner and radially inner arc portion 19, said tangentially inner and radially outer arc portion 29 and said tangentially outer side portion 28, or second slot arc tangents n-n, p-p define a closed polygonal figure with said second slot side extensions j-j, k-k, s-s, q-q.

According to an embodiment, said tangentially inner and radially outer arc portion 29 and said tangentially outer side portion 28 join at a joining point 30.

According to an alternative embodiment, said tangentially outer side portion 28 comprises a tangentially outer and radially outer arc portion 49.

According to an alternative embodiment, the curvature radius r5 of said tangentially outer and radially outer arc portion 49 has substantially the same length as the curvature radius r5 of said tangentially inner and radially outer arc 29 and is equal to said fifth curvature radius r5.

According to an alternative embodiment, said tangentially inner and radially outer arc portion 29 and said tangentially outer and radially outer arc portion 49 join at said joining point 30.

According to an embodiment, said joining point 30 has a seventh curvature radius r7 smaller than said first curvature radius r1, than said second curvature radius r2, than said curvature radius r3, than said fourth curvature radius r4, than said fifth curvature radius r5, and than said sixth curvature radius r6.

From the analysis performed by the inventors, it emerges that such shapes of the slot profiles 10, 20 allows to relieve the tangential components of the force deriving from the braking action simultaneously on both pins 33 of the brake caliper 1 to which pad 2 is mounted with clearance.

Such a pad 2 is adapted to be mounted with clearance to pins 33 of brake calipers pre-existing the present invention, allowing the retro-fitting operations.

The provision of such a geometry of slot profiles 10, 20 allows an optimal distribution of the tangential components of the forces exchanged between pad 2 and pins 33 during the braking action, as shown in detail below.

When pad 2 is in use, each of said first slot profile 10 and said second slot profile 20 comprises at least one contact portion 34 between pad 2 and the respective pin 33.

By providing said slot profiles 10, 20 during the braking action, the contact portions 34 between pad 2 and each pin 33 gradually move along the slot profiles 10, 20, so as to always keep the contact between pad 2 and pins 33, thus preventing the pins 33 from detaching even only from one slot profile 10, 20.

Figure 5:
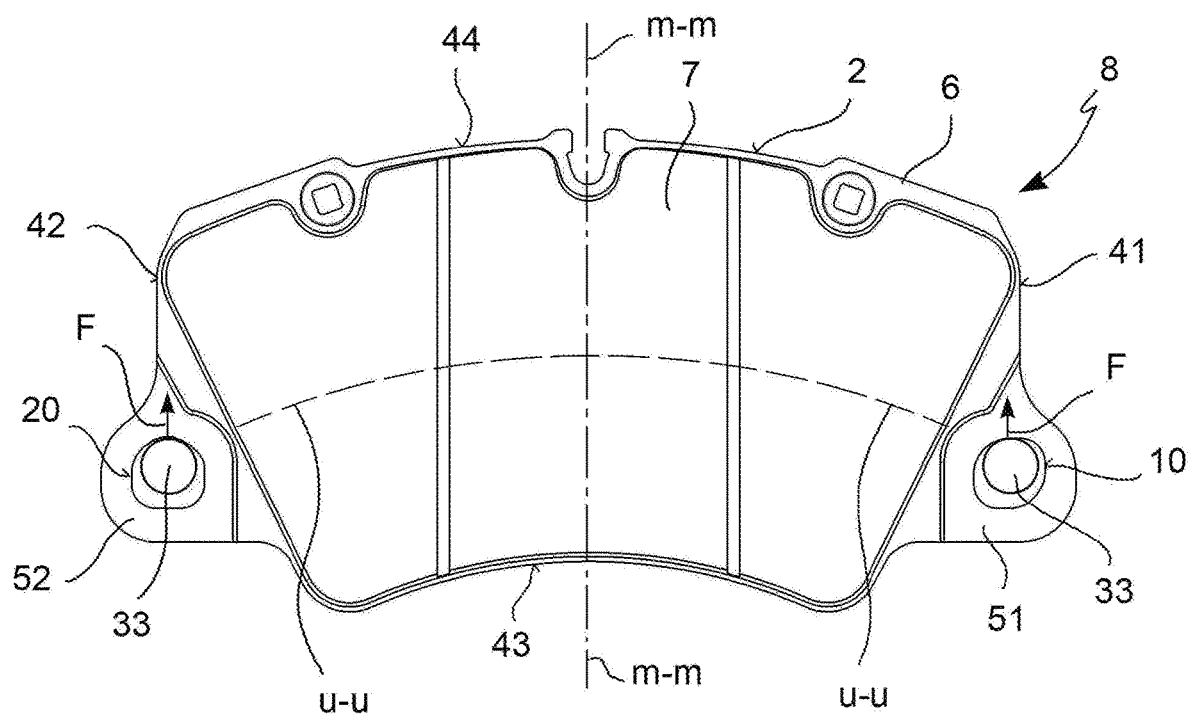
FIG. 5 is a front view diagram of an assembly comprising a pad and two pins, according to an embodiment, in unbraked conditions.

As shown in FIG. 5, when the vehicle proceeds in forward travel or reversing conditions, the contact portions 34 between pad and pins 33 are arranged respectively on the first profile radially outer side 12 and on the joining point 30 of the second slot profile 20.

When the braking starts, pad 2 performs a movement mainly due to the friction force between friction material 7 of the pad and the braking band 5 of the brake disc.

As shown in the figures from 6 to 8, when the braking action occurs in forward driving conditions of the vehicle, which corresponds to a counterclockwise rotation direction D of the brake caliper 4 (not shown), the pad moves so as to follow the rotation direction D of the brake disc 4.

Figure 6:
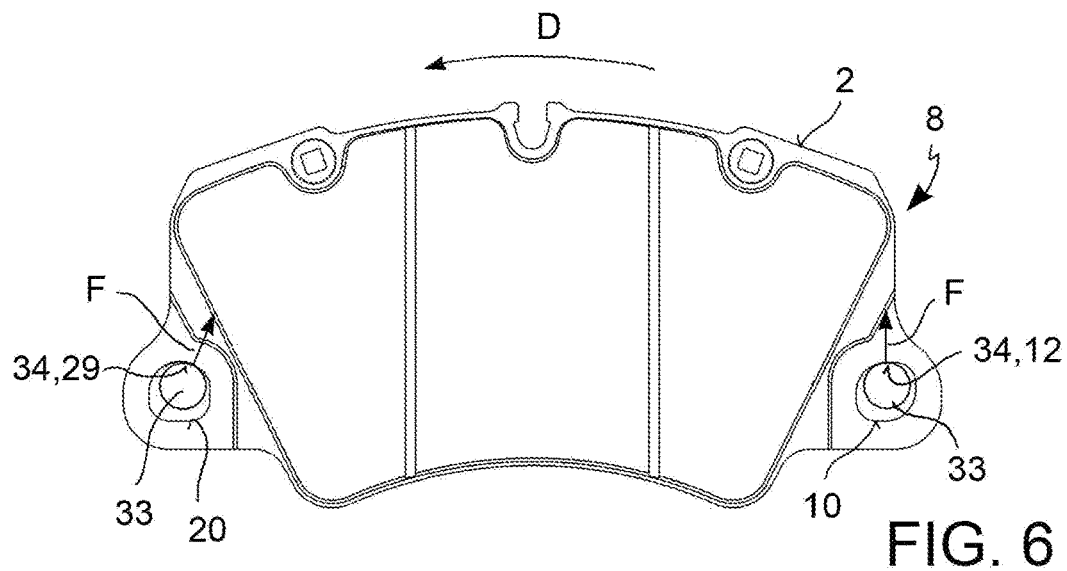
FIGS. 6 to 8 are front view diagrams of an assembly comprising a pad and two pins, according to a first embodiment, which show different steps of braking, in forward travel conditions of the vehicle.

As shown in FIG. 6, by virtue of the shape of the slot profiles 10, 20 described above, the contact portion 34 of the second slot profile 20 gradually moves onto the tangential inner and radially outer portion 29.

Figure 7:
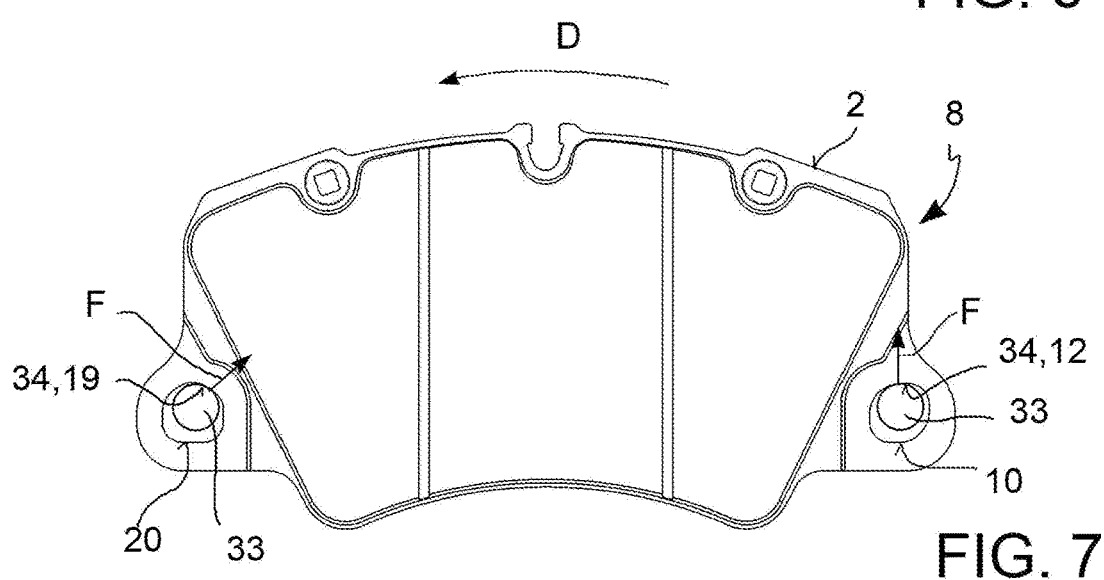

As shown in FIG. 7, successively the contact portion 34 of the second slot profile 20 gradually moves onto the tangentially inner and radially inner arc portion 19.

Figure 8:
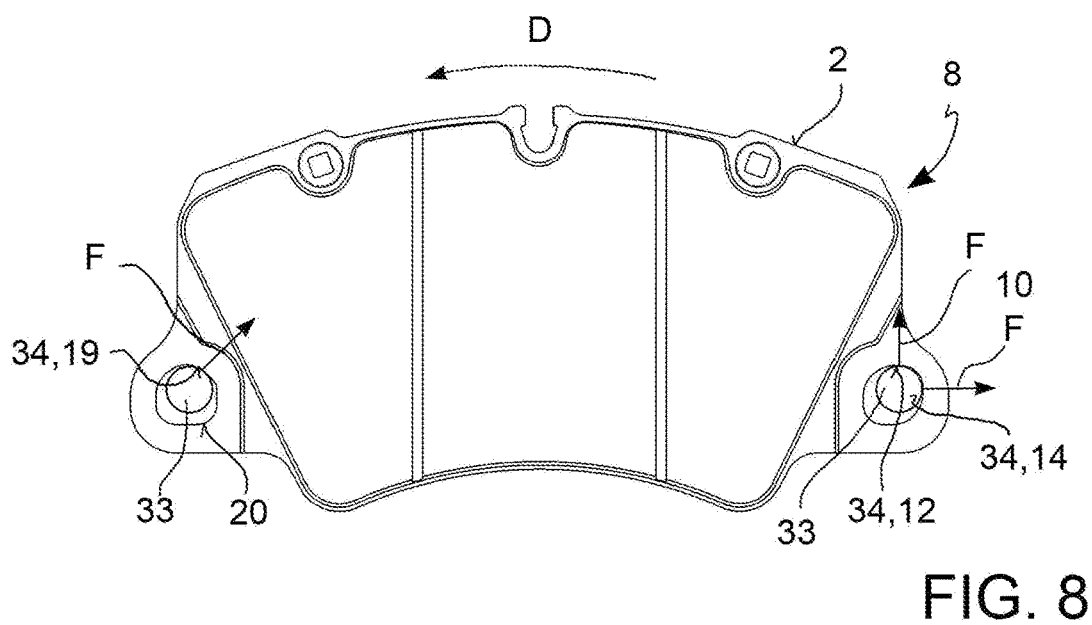

As shown in FIG. 8, by virtue of the first profile radially outer and tangentially outer arc 16, the contact portions 34 of the first slot profile 10 gradually settle on the radially outer side 12 and on the tangentially outer side 14.

As shown in figures from 9 to 11, when the braking action occurs in reverse driving conditions of the vehicle, which corresponds to a clockwise rotation direction D of the brake caliper (not shown), the pad moves so as to follow the rotation direction D of the brake disc 4.

Figure 9:
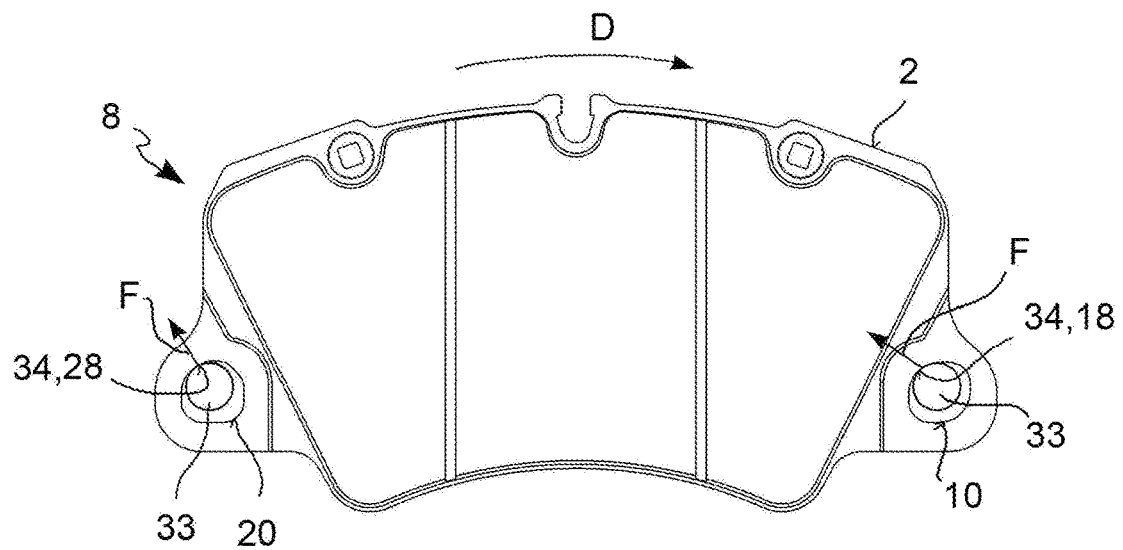
FIGS. 9 to 11 are diagrammatic front views of an assembly comprising a pad and two pins, according to a first embodiment, which shows different steps of braking, in reversing conditions of the vehicle.

As shown in FIG. 9, by virtue of the shape of the slot profiles 10, 20 previously described, the contact portion 34 of the first slot profile 10 gradually moves onto the first slot radially outer and tangentially inner arc 18, and the contact portion 34 of the second slot profile 20 gradually moves onto the tangentially outer side portion 28. According to an alternative embodiment, the contact portion 34 of the first slot profile 10 gradually moves onto the first slot radially outer and tangentially inner arc 18, and the contact portion 34 of the second slot profile 20 gradually moves onto the tangentially outer and radially outer side portion 49.

Figure 10:
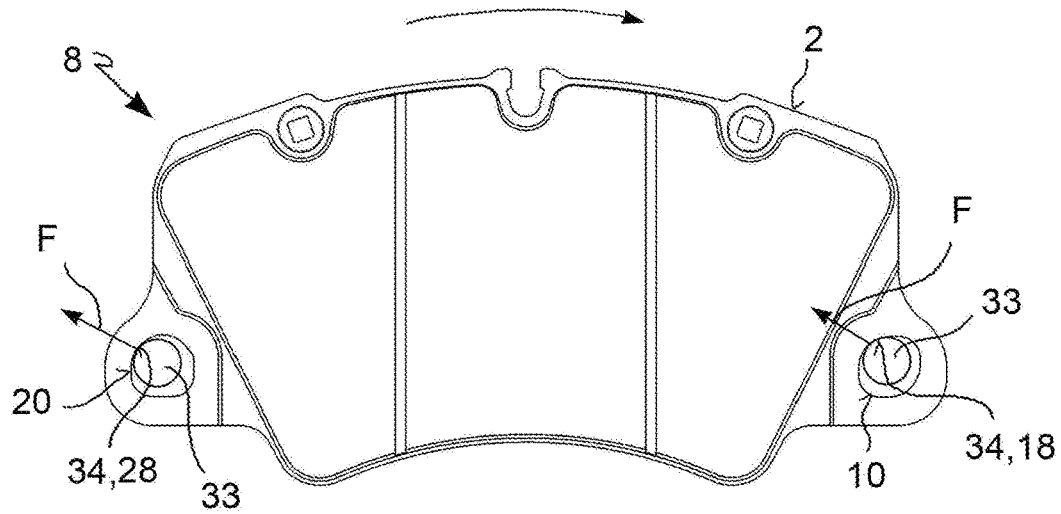

As shown in FIG. 10, successive the contact portion 34 of the second slot profile 20 gradually moves along the tangentially outer side portion 28.

Figure 11:
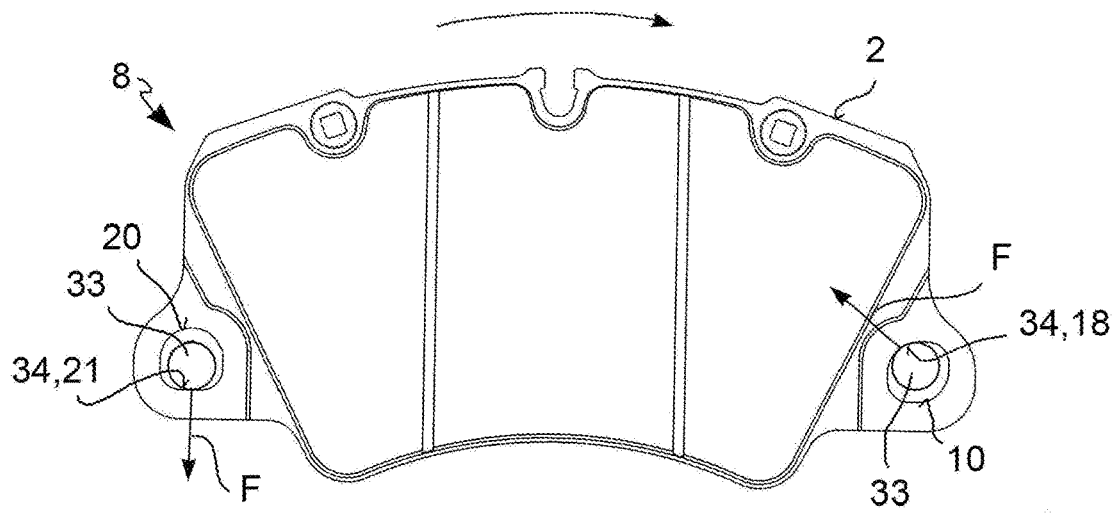
Figure 12:
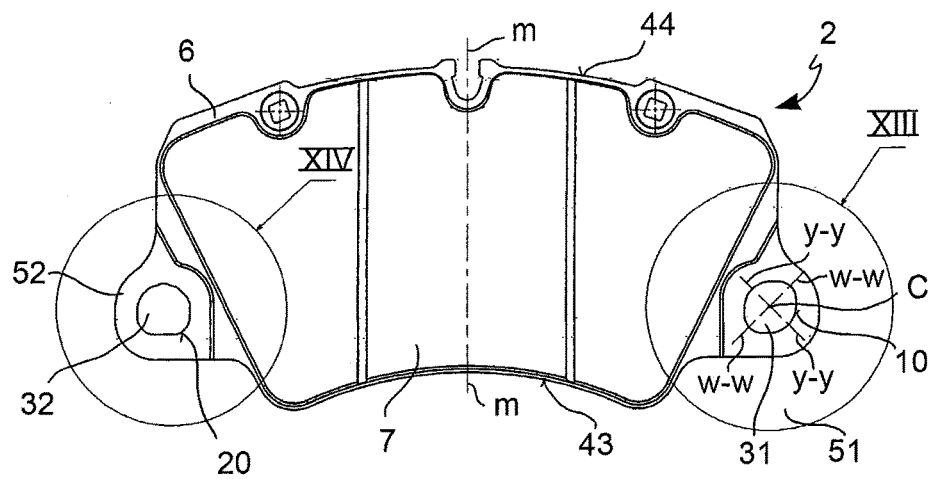
FIG. 12 is a front view of a pad, according to an embodiment.
Figure 13:
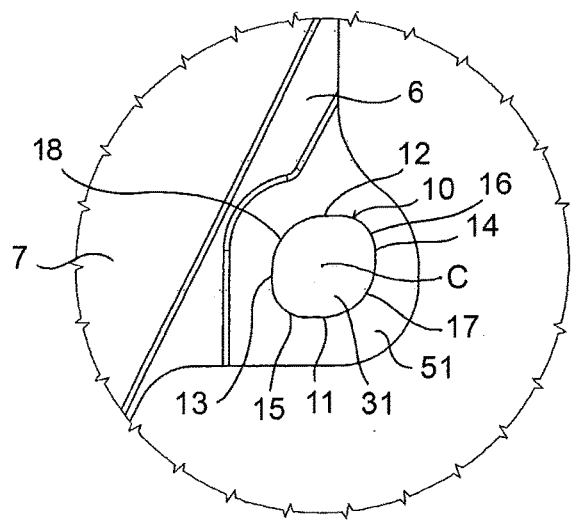
FIGS. 13 and 14 are enlargements of the portions shown by the arrows XIII and XIV in FIG. 12, respectively.
Figure 14:
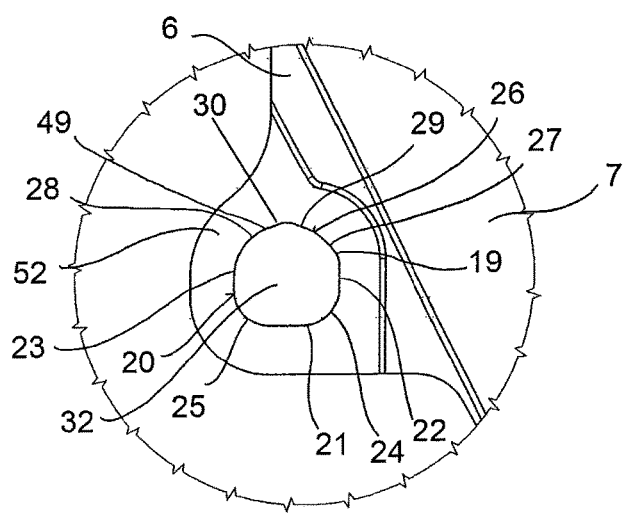

As shown in FIG. 11, the contact portion 34 of the second slot profile 20 gradually moves onto the second slot radially inner side 21 and settles on the second slot radially inner side 21. At the same time, the second side 42 of pad 2 gradually moves radially away from the rotation axis of the brake disc 4 determining a gradual rotation of the entire pad 2. At the same time, the contact portion 34 of the first slot portion 10 settles on the first profile radially outer and tangentially inner arc 18.

By virtue of the features described above, either separately or jointly provided in particular embodiments, it is possible to obtain a pad which simultaneously satisfies the aforesaid mutually contrasting needs and the aforesaid desired advantages, and in particular:

allowing the assembly with clearance of the pad on the pins, avoiding the detachment of even only one pin from its respective slot profile, at least strongly mitigating the onset of knocking noise, due to the collision between slot wall and respective pin, distributing the load deriving from the braking action on both pins simultaneously, allowing to apply a quieter braking than known solutions.

According to a more general embodiment, a pad and pin assembly 8 comprises a pad 2 according to any one of the embodiments described above and at least two pins 33. Said at least two pins 33 are mounted to the caliper body 9 so as to accommodate the respective slots 31, 32 of pad 2 with clearance.

According to an embodiment, each of said pins 33 has a pin profile 35, adapted to contact a respective portion of the slot profile 10, 20 of the slot 31, 32 fitted on pin 33 with a portion thereof.

According to a preferred embodiment, said pin profiles 35 describe a substantially circular embodiment.

Such a pad and pin assembly 8 is compatible with the caliper bodies 9 of brake calipers 1 pre-existing the invention, allows retro-fitting operations.

According to a general embodiment, a brake caliper 1 for brake disc of a vehicle comprises a caliper body 9, at least two pins 33, adapted to overhang from said caliper body 9 towards the braking band 5 of an associable brake disc 4, at least one pad 2, according to any one of the embodiments described above.

According to an embodiment, said pad 2 is mounted with clearance to said pins 33.

According to an embodiment, said brake caliper 1 comprises at least one of said pad and pin assemblies 8.

A method of positioning a pad 2 with respect to at least two pins 33, during the braking action, is described below.

A method of positioning a pad during the braking action comprises the following steps:

providing at least one pad 2 according to any one of the embodiments described above;

fitting said at least two slots 31, 32 on respective pins 33 provided with an associable caliper body 9;

gradually moving the contact portion 34 between pad 2 and pins 33 along the slot profiles 10, 20, so as to always keep the contact between pad 2 and pins 33, preventing the pins 33 from detaching even only from one slot profile 10, 20.

According to a possible mode of operation, a method comprises a least one, but even all of the following steps, to be carried out preferably in the following order:

when in forward travel conditions of the vehicle, gradually moving the contact portion 34 of the second slot profile 20 onto the tangentially inner and radially outer arc portion 29;

gradually abutting the contact portions 34 of the first slot profile 10 onto the first slot radially outer side 12 and onto the first slot tangentially outer side 14.

According to a possible mode of operation, a method comprises a least one, but even all of the following steps, to be carried out preferably in the following order:

when in reversing conditions of the vehicle, gradually moving the contact portion 34 of the first slot profile 10 onto the first slot radially outer and tangentially inner arc 18;

at the same time, gradually moving the contact portion 34 of the second slot profile 20 onto the tangentially outer side portion 28;

gradually moving the contact portion 34 of the second slot profile 20 onto the tangentially outer and radially outer arc portion 49;

as the braking force F increases, gradually moving the contact portion 34 of the second slot profile 20 onto the second slot radially inner side 21;

abutting the contact portion 34 of the second slot profile 20 onto the second slot radially inner side 21;

at the same time, abutting the contact portion 34 of the first slot portion 10 onto the first profile radially outer and tangentially inner arc 18.

Those skilled in art may make many changes and adaptations to the embodiments described above or may replace elements with others which are functionally equivalent in order to satisfy contingent needs without however departing from the scope of the appended claims.

LIST OF REFERENCES

| | LIST OF REFERENCES |
|---|---|
| 1 | brake caliper |
| 2 | pad |
| 3 | disc brake |
| 4 | brake disc |
| 5 | braking band |
| 6 | plate |
| 7 | friction material |
| 8 | pad and pin assembly |
| 9 | caliper body |
| 10 | first slot profile |
| 11 | first slot radially inner side |
| 12 | first slot radially outer side |
| 13 | first slot tangentially inner side |
| 14 | first slot tangentially outer side |
| 15 | first slot radially inner and tangentially inner arc |
| 16 | first slot radially outer and tangentially outer arc |
| 17 | first slot radially inner and tangentially outer arc |
| 18 | first slot radially outer and tangentially inner arc |
| 19 | tangentially inner and radially inner arc portion |
| 20 | second slot profile |
| 21 | second slot radially inner side |
| 22 | second slot tangentially inner side |
| 23 | second slot tangentially outer side |
| 24 | second slot radially inner and tangentially inner arc |
| 25 | second slot radially inner and tangentially outer arc |
| 26 | second slot radially outer arc |
| 27 | tangentially inner side portion |
| 28 | tangentially outer side portion |
| 29 | tangentially inner and radially outer side portion |
| 30 | joining point |
| 31 | first slot |
| 32 | second slot |
| 33 | pin |
| 34 | contact portion |
| 35 | pin profile |
| 41 | first side |
| 42 | second side |
| 43 | radially inner edge |

-continued

LIST OF REFERENCES

| | | |
|---|---|---|
| 44 | radially outer edge | |
| 49 | tangentially outer and radially outer arc portion | |
| 51 | first side ear | |
| 52 | second side ear | |
| 53 | ear surface | |
| A-A | axial direction | |
| R-R | radial direction | |
| T-T | tangential or circumferential direction | |
| C | first profile symmetry center | |
| y-y | first profile symmetry axis | |
| w-w | first profile symmetry axis | |
| m-m | median axis | |
| D | disc rotation direction | |
| F | braking force | |
| f-f | first slot side extension | |
| g-g | first slot side extension | |
| h-h | first slot side extension | |
| i-i | first slot side extension | |
| j-j | second slot side extension | |
| k-k | second slot side extension | |
| n-n | second slot arc tangent | |
| p-p | second slot arc tangent | |
| q-q | second slot side extension | |
| s-s | second slot side extension | |
| u-u | radial centerline | |
| r1 | first curvature radius | |
| r2 | second curvature radius | |
| r3 | third curvature radius | |
| r4 | fourth curvature radius | |
| r5 | fifth curvature radius | |
| r6 | sixth curvature radius | |
| r7 | seventh curvature radius | |

The invention claimed is:

1. A pad for a brake caliper for a disc brake of a vehicle comprising a caliper body and a brake disc, adapted to abut against a braking band of the brake disc,
wherein said disc brake defining an axial direction, either coinciding with or parallel to the rotation axis of the brake disc, a radial direction, orthogonal to the axial direction, and a tangential or circumferential direction, orthogonal to both the axial direction and the radial direction;
wherein said pad comprises at least one plate and one friction material supported by said plate;
wherein said plate has prevalent extension along the radial and tangential directions;
wherein said plate comprises a radially inner edge and a radially outer edge;
wherein said plate comprises a first side and a second side, arranged at opposite tangential ends of the plate;
wherein said plate further comprises at least a first side ear, which extends from said first side at least in tangential direction, and at least a second side ear, which extends from said second side at least in tangential direction;
and wherein said first side ear is provided with at least a first slot, and wherein said second side ear is provided with at least a second slot, so that said plate comprises at least two slots;
wherein said at least two slots are adapted to accommodate with clearance corresponding associable pins mounted to the caliper body;
wherein said at least first slot defines a first slot profile on the plate and said at least second slot defines a second slot profile on the plate,
wherein each of said first slot profile and said second slot profile forms a closed path; and
wherein said slot profiles have a different shape, preventing said plate from being symmetric or specular,
wherein said first slot profile is symmetric with respect to two symmetry axes;
wherein said second slot profile has a non-symmetric or non-specular shape;
wherein said first slot profile comprises four first slot sides having four first slot rectilinear portions and four first slot arcs,
wherein said four first slot arcs comprise a first slot radially inner and tangentially inner arc, a first slot radially outer and tangentially outer arc, a first slot radially inner and tangentially outer arc, and a first slot radially outer and tangentially inner arc,
wherein the curvature radius of said first slot radially inner and tangentially inner arc, and said first slot radially outer and tangentially outer arc are substantially of the same length and equal to a first curvature radius,
wherein the curvature radius of saki first slot radially inner and tangentially outer arc, and said first slot radially outer and tangentially inner arc are substantially of the same length and equal to a second curvature radius, and
said first curvature radius is smaller than said second curvature radius;
and wherein said second slot profile comprises at least five second slot sides,
wherein said at least five second slot sides are joined by second slot curved or arc portions,
wherein said second slot curved or arc portions comprise at least a second slot radially outer arc,
wherein said second slot radially outer arc comprises at least a tangentially inner side portion and a tangentially outer side portion,
and wherein said tangentially inner side portion comprises a radially inner arc portion and a radially outer side portion, so that said second slot radially outer arc comprises a tangentially inner and radially inner arc portion, a tangentially inner and radially outer side portion, and a tangentially outer side portion,
wherein said tangentially outer side portion comprises a tangentially outer and radially outer arc portion,
wherein said tangentially inner and radially outer side portion and said tangentially outer and radially outer arc portion join at a joining point.

2. The pad according to claim 1, wherein said two symmetry axes are mutually orthogonal;
and wherein said first slot profile is symmetric with respect to said two symmetry axes, so that said first slot profile describes a central symmetric figure.

3. The pad according to claim 1, wherein each of said first slot profile and said second slot profile forms a convex figure;
and wherein said four first slot rectilinear portions comprise a first slot radially inner side and a first slot radially outer side;
and wherein said four first slot rectilinear portions comprise a first slot tangentially inner side and a first slot tangentially outer side;
and wherein said four first slot rectilinear portions define with their extensions or first slot side extensions a quadrilateral, having four equal angles, which circumscribe said first slot profile;
and/or wherein said four first slot rectilinear portions are joined by said four first slot arcs;

and/or wherein said four first slot arcs face and are opposite to each other in pairs.

4. A pad according to claim 1, wherein said at least five second slot sides comprises five second slot sides;

and/or wherein said five second slot sides comprise a second slot radially inner side, a second slot tangentially inner side, and a second slot tangentially outer side;

and/or wherein said second slot tangentially inner side and said second slot tangentially outer side are parallel and face each other;

and/or wherein said second slot tangentially inner side is longer than said second slot tangentially outer side;

and/or wherein said second slot curved or arc portions comprise a second slot radially inner and tangentially inner arc, a second slot radially inner and tangentially outer arc, and said second slot radially outer arc;

and/or wherein said second slot curved or arc portions have different curvature radii;

and/or wherein said second slot radially outer arc joins said second slot tangentially inner side and said second slot tangentially outer side;

and/or wherein said tangentially inner and radially outer side portion and said tangentially outer side portion join at said joining point with curvature radius equal to a seventh curvature radius;

and/or wherein the curvature radius of said tangentially outer and radially outer arc portion has substantially the same length as the curvature radius of said tangentially inner and radially outer side.

5. The pad according claim 1, wherein a radial centerline is defined, adapted to divide substantially in half the radial distance between said radially inner edge and said radially outer edge, and wherein said first side ear and said second side ear extend from side portions at least partially arranged in a radially inner portion of the plate with respect to the radial centerline.

6. The pad according to claim 1, further comprising a pin assembly comprised of at least two pins, wherein each of said pins has a pin profile, adapted to contact at least one portion thereof with a respective portion of one of said first slot profile or said second slot profile of the slot fitted on a respective one of said pins.

7. The pad according to claim 6, wherein in said assembly said pin profiles describe a substantially circular shape.

* * * * *

UNITED STATES PATENT AND TRADEMARK OFFICE
CERTIFICATE OF CORRECTION

PATENT NO. : 10,690,202 B2  
APPLICATION NO. : 15/475263  
DATED : June 23, 2020  
INVENTOR(S) : Cristian Crippa et al.

Page 1 of 1

It is certified that error appears in the above-identified patent and that said Letters Patent is hereby corrected as shown below:

In the Claims

Claim 1, Column 12, Line 21, delete "saki" and insert --said-- in its place

Signed and Sealed this
Eighteenth Day of August, 2020

Andrei Iancu
*Director of the United States Patent and Trademark Office*